United States Patent [19]

Kolk et al.

[11] 4,232,471
[45] Nov. 11, 1980

[54] CRABBING CHUM LURE

[76] Inventors: Glenn R. Kolk, 7 Claverack Rd.;
Wayne Haraka, 338 Grove St., both
of Clifton, N.J. 07013

[21] Appl. No.: 16,663

[22] Filed: Mar. 1, 1979

[51] Int. Cl.³ .............................................. A01K 97/02
[52] U.S. Cl. .................................................. 43/44.99
[58] Field of Search ....................... 43/41, 41.2, 42.06, 43/44.2, 44.99, 102

[56] References Cited

U.S. PATENT DOCUMENTS

| | | | |
|---|---|---|---|
| 636,694 | 11/1899 | Pflueger | 43/41 |
| 1,464,163 | 8/1923 | Abernethy | |
| 2,556,634 | 6/1951 | Redinger | |
| 2,583,660 | 1/1952 | Moore | 43/44.99 |
| 2,709,317 | 5/1955 | Pease | 43/44.99 |
| 2,749,647 | 6/1956 | Beloff | 43/42.06 |
| 2,765,575 | 10/1956 | Gfroerer | |
| 2,871,611 | 2/1959 | Shepard | 43/44.2 |
| 2,877,593 | 3/1959 | Baldridge | 43/42.74 |
| 2,892,283 | 6/1959 | Hudson | 43/43.4 |
| 2,941,327 | 6/1960 | Rundell | 43/44.99 |
| 2,968,113 | 1/1961 | Multanen | 43/42.06 |
| 2,994,983 | 8/1961 | Best | 43/41 |
| 3,066,434 | 12/1962 | Duller | 43/42.06 |
| 3,084,471 | 4/1963 | Alspaugh | 43/44.99 |
| 3,134,190 | 5/1964 | Triplett et al. | 43/44.82 |
| 3,183,620 | 5/1965 | Dolkai | 43/42.74 |
| 3,303,598 | 2/1967 | Spindler | 43/44.9 |
| 3,453,768 | 7/1969 | Feaster et al. | 43/42.06 |
| 3,953,934 | 5/1976 | Visser | 43/42.06 |
| 3,974,591 | 8/1976 | Ray | 43/43.14 |
| 4,021,959 | 5/1977 | Ankowiak | 43/41 |

*Primary Examiner*—Nicholas P. Godici
*Assistant Examiner*—K. Bradford Adolphson
*Attorney, Agent, or Firm*—David A. Jackson

[57] ABSTRACT

A chum lure is disclosed which comprises an essentially tubular central body portion sealed at one end thereof to hold a quantity of chum material, said body portion provided with a plurality of holes to permit the gradual escape of the chumming material. The chum lure includes at least one prong or bait rod radially extending from the closed end of the body portion, which is provided to secure solid bait thereon. A cap which includes an eye for attachment of the lure to an appropriate control line or the like, is removably associated with the open end of the body portion to assist in retaining the loaded chum material. Means for securing the cap and the free end of the prong to the body portion is provided comprising at least two mating holes located in the rim of the cap and the corresponding side wall of the body. The lure is secured by the placement of the free end of the prong within the mating holes.

10 Claims, 5 Drawing Figures

U.S. Patent  Nov. 11, 1980  4,232,471
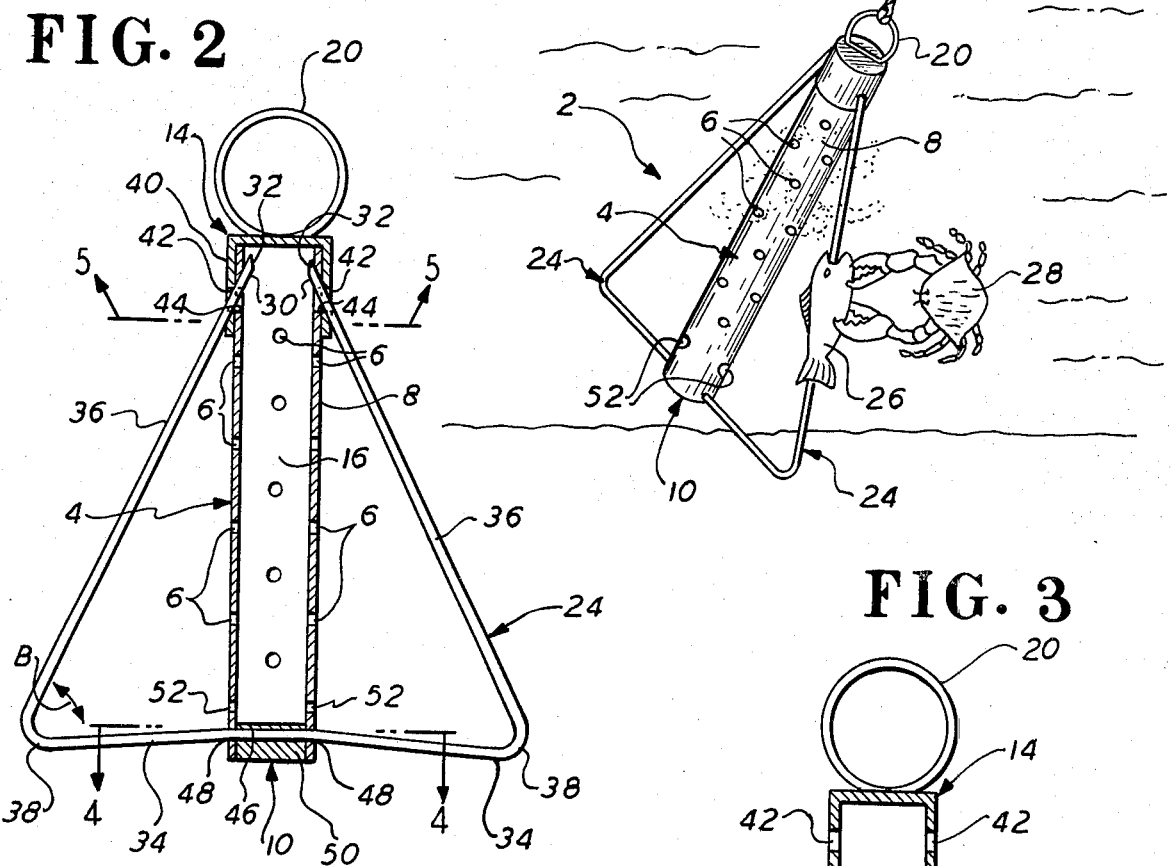
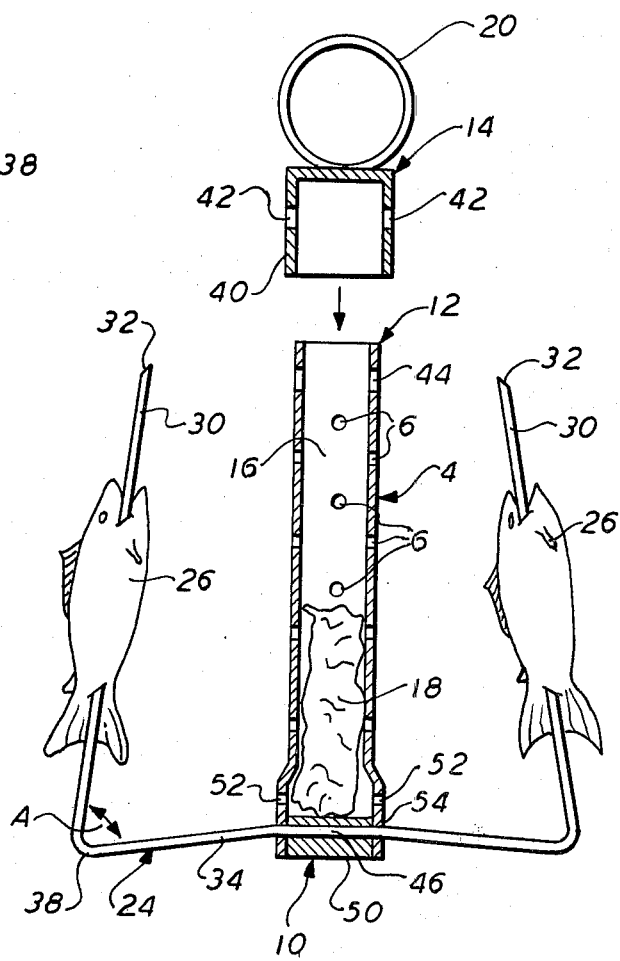
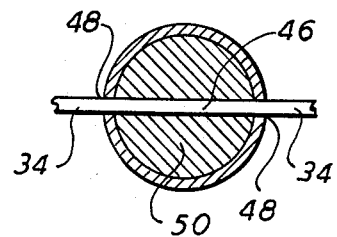
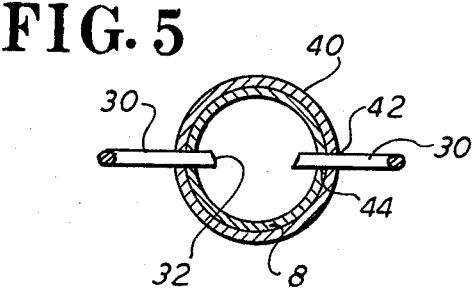

CRABBING CHUM LURE

BACKGROUND OF THE INVENTION

The present invention relates generally to chum lures, and more particularly to chum lures useful for catching crabs, lobsters and the like.

The prior art is replete with a variety of devices useful to dispense a granular material known as chum for the attraction of marine animals such as fish, lobsters and the like. The majority of the prior art devices relate to structures, generally cylindrical in shape, which define appropriate cylindrical cavities provided with perforated walls for the gradual release of chum material into the water when the device is in use. For example, U.S. Pat. No. 2,709,317 to Pease, Sr. relies on a cylindrical body to hold the chum, which body is provided with a plurality of holes allowing the chum to escape into the water. Pease, Sr. also defines a transverse rod which provides eyelets for attachment of parallel hooks to impale live bait or the like thereon. Likewise, U.S. Pat. No. 2,556,634 to Redinger defines a cylindrical perforated body providing a repository and release mechanism for chum which has attached thereto two hooks designed to receive live bait.

In addition to Pease, Sr. and Redinger a series of patents, all listed as follows, illustrate the employment of devices to hold and dispense chum material, which devices differ from each other in configuration, manner of assembly and displacement of hooks, if any. Thus, U.S. Pat. No. 2,765,575 to Gfroerer, discloses a cylindrical chum holder in combination with a rod providing points of attachment for fishing hooks. U.S. Pat. No. 4,021,959 to Antkowiak employs a cylindrical body for the retention of live minnow bait and an outer rod for attachment of external hooks. U.S. Pat. No. 3,183,620 to Dockal discloses hook extensions provided in whorled relationship projecting from a cylindrical body having perforations for the dispensing of chum. U.S. Pat. No. 2,749,647, to Beloff, discloses a chum lure in the shape of a fish. U.S. Pat. No. 3,974,591 to Ray discloses a perforated chum holder which opens into two half sections which snap-lock together internally. U.S. Pat. No. 2,941,327 to Rundell relates to a chum pot adapted to a movable trap door located in its base to periodically dispense chum in lump fashion at locations in the water. Also, U.S. Pat. No. 3,084,471 to Alspaugh relates to a chum dispenser having a weight at the bottom and connection by an eyelet to a line which may also define hook for live bait.

In addition to the foregoing references, other references were disclosed which are listed serially herein: U.S. Pat. No. 2,877,593 to Baldridge; U.S. Pat. No. 2,892,283 to Hudson; U.S. Pat. No. 2,968,113 to Multanen; U.S. Pat. No. 3,453,768 to Feaster et al; U.S. Pat. No. 3,066,434 to Duller; U.S. Pat. No. 3,134,190 to Triplett et al; U.S. Pat. No. 3,953,934 to Visser; U.S. Pat. No. 2,583,660 to Moore; U.S. Pat. No. 3,303,598 to Spindler; and U.S. Pat. No. 1,464,163 to Abernethy.

All of the foregoing references were considered in detail, but were determined to be incapable of solving the problems faced in the employment of chum dispensers suitable also for catching crabs, lobsters and the like. Specifically, the live bait hooks employed in many of the prior art chum holder devices would be inadequate to secure the attachment of a shell fish such as a crab, as the shell fish possesses a hard exterior which would not be penetrated by the conventional hook. Further, most shell fish use their claws to masticate their food, and could remove the bait from the hook without becoming impaled thereon. Thus, for a device to be useful, it must provide a point of attachment for the crab or lobster, preferably to a piece of bait which offers difficulty in the removal of the bait sufficient to enable the fisherman to capture the shell fish. Moreover, the crab or lobster must retain interest with the lure, and particularly in the instance where whole bait is employed, must be unable to easily remove the whole bait from its point of attachment.

The present invention is believed to provide a solution to the aforenoted problems faced by the prior art.

SUMMARY OF THE INVENTION

In accordance with the present invention, a chum lure useful for fishing, crabbing and the like is disclosed which comprises a centrally located, tubular body sealed at one end thereof to hold a quantity of chumming material, said body including a cylindrical side wall defining a plurality of holes to permit the gradual escape of the chumming material. The chum lure includes at least one prong or bait rod which originates from the closed end of the body and extends outwardly to define a distal free end adapted to impale and retain the whole bait thereon. A removable cap is provided to sealingly engage the open end of the body to prevent the premature escape of the chumming material. The cap includes an upstanding eye projecting away from the body which serves as a point of attachment for a control line or the like. The chum lure of the present invention includes means for securing the cap and the free end of the bait rod to the body comprising mating openings provided in the rim of the cap and the corresponding side wall of the body which receive the free end of the bait rod.

The present chumming lure is of simple construction and provides an improved securement of whole bait, in that the bait is skewered by the bait rod, which is then secured within the body of the lure so that neither end thereof is free. In this way, the whole bait cannot be slidably removed from the bait rod, or torn away, as from a peripheral attachment to a hook or the like. Correspondingly, the body containing the chumming material is easily secured without the use of additional bolts, lines or the like which tend to complicate the bait-loading process.

The present chumming lure may be manufactured from a wide variety of materials possessing a sufficient immunity to the marine environment as well as resilience and strength in use.

Accordingly, it is a principal object of the present invention to provide a chumming lure useful for fishing, including shellfishing which is of simple, durable construction.

It is a yet further object of the present invention to provide a chumming lure as aforesaid which is comprised of a minimum number of separate components which may be easily reloaded with fresh bait and chumming material.

It is a yet further object of the present invention to provide a chumming lure as aforesaid which includes means for the fast attachment and positive retention of whole bait.

Other objects and advantages will become apparent to those skilled in the art from a consideration of the ensuing description which proceeds with reference to the following accompanying drawings.

BRIEF DESCRIPTION OF THE DRAWINGS

FIG. 1 comprises a perspective view illustrating the chum lure of the present invention being used to catch crabs.

FIG. 2 is a side view partly in section illustrating the chumming lure of FIG. 1 in full assembly.

FIG. 3 is an exploded side view partly in section similar to FIG. 2 illustrating the chumming lure of the present invention being loaded with bait prior to use.

FIG. 4 is a fragmentary sectional view taken through line 4—4 of FIG. 2 illustrating one embodiment of the mounting of the bait rods within the body.

FIG. 5 is a fragmentary sectional view illustrating the securement means of the present invention.

DETAILED DESCRIPTION OF THE INVENTION

In accordance with the present invention, the foregoing objects and advantages are readily attained.

Referring to the Figures wherein like numerals designate like parts, and particularly with reference to FIG. 1, the chumming lure of the present invention is generally denoted at 2 and comprises a central, elongated, tubular body 4 which is adapted to hold a quantity of chumming material, shown to be issuing from a plurality of escape holes or perforations 6, into the water. Body 4 comprises a cylindrical side wall 8 within which holes 6 are located. Side wall 8, in turn, defines the internal area comprising a chum compartment 16 in FIGS. 2 and 3. Body 4 further defines a first closed end 10 and a second open end 12, illustrated in FIG. 3. A cap 14 is provided to sealingly engage open end 12 to close off chum compartment 16, so that the chumming material 18 as illustrated in FIG. 3, will not be prematurely released when lure 2 is lowered into the water. Cap 14 further includes a ring-like eye 20 which is provided in an upstanding relationship and serves as a point of attachment of lure 2 to an appropriate control line or the like, such as line 22 illustrated in FIG. 1.

Referring again to FIG. 1, chum lure 2 further comprises at least one non-linear prong or bait rod 24 which extends outward in a generally radial direction from a point of attachment at closed end 10. Though the present description and the accompanying drawings proceed with reference to the provision of two bait rods 24, it is to be understood that the invention is not limited thereto, as the invention requires only that at least one bait rod be present, for reasons to be described later on herein. Thus, the chumming lure of the present invention may employ a plurality of bait rods 24 exceeding the number illustrated, all in a manner apparent to those skilled in the art upon a review of the present disclosure.

Referring again to the Figures, and particularly to FIGS. 1 and 3, bait rod 24 serves in one aspect of the invention to impale and retain whole bait securely adjacent lure 2. Thus, as illustrated, whole bait such as a fish 26 may be skewered along its entire longitudinal dimension and thus mounted on bait rod 24 for secure display to attract a shell fish such as a crab 28 as illustrated in FIG. 1. Thus, free end 30 of bait-rod 24 is provided with a beveled edge which makes it easier to impale live bait such as fish 26 on bait rod 24.

Bait rod 24 is seen in greater detail in FIGS. 2 and 3 to comprise a proximal arm 34 which radiates from a point of supported attachment to closed end 10 of body 4, in a direction generally transverse to the longitudinal axis of body 4. Thus as illustrated in the Figures, proximal arm 34 projects radially away from body 4 in a direction illustrated as substantially perpendicular to the longitudinal axis of the body. It is to be understood, however, that the exact angle of departure of arm 34 is not critical and may vary in accordance with the present invention.

Bait rod 24 further includes a distal arm 36 which is further removed from body 4, and which is connected to proximal arm 34 by curved elbow portion 38. Distal arm 36 is seen, in FIGS. 1 and 3 to define at the distalmost end thereof free end 30 and bevel 32. Thus, when whole bait is impaled upon free end 30, it is then pushed home and retained on distal arm 36 as illustrated.

In a preferred embodiment, bait rod 24 defines a particular configuration whereby proximal arm 34 and distal arm 36 are disposed at an angle with respect to each other, and in particular, subtend an acute angle opening in the direction of body 4. Referring now to FIG. 3, the lure of the present invention is illustrated in exploded disassembled condition, whereby distal arms 36 are disengaged from body 4 and therefore are available for placement of whole bait thereon. In this position, proximal arm 24 and distal arm 36 subtend an acute angle labeled A in the Figure. By contrast, as shown in FIGS. 1 and 2, when the bait is loaded and bait rods 24 are again secured within body 4, the angle defined by proximal arm 34 and distal arm 36, labeled B in FIG. 2, is smaller in size than angle A referred to above, but is nonetheless an acute angle as determined in the direction of body 4. Though the foregoing discussion has dealt with the angular configuration of bait rod 24, it is to be understood that the invention is not limited thereto, as it is merely required that bait rod 24 be non-linear in configuration. Thus, the angular configurations illustrated herein comprise merely a preferred embodiment and the invention should not be limited thereto.

An important aspect of the chumming lure of the present invention comprises the provision of a distinctive means for securing cap 14 and the free ends 30 of bait rods 24 so as to prevent the premature escape of both the whole bait 26 and the chumming material 18 while the lure 2 is submerged in the water. Referring now to FIG. 2, cap 14 is seen to define a continuous rim 40 adapted for annular engagement with a portion of side wall 8 located adjacent open end 12. Rim 40 thus defines in cross-section, as illustrated in FIG. 5, a circumference which is annularly outwardly displaced with respect to the circumference of side wall 8, whereby rim 40 is adapted to telescopically receive the portion of side wall 8 adjacent open end 12. The securing means of the present invention is defined in part by rim 40 and side wall 8, and comprises mating openings 42, and 44, which are respectively adapted for axial alignment with each other when cap 14 is properly mounted on open end 12. Further, openings 42 and 44 are adapted for axial alignment with free ends 30 of bait rod 24, whereby, upon completion of the reloading of the bait as illustrated in FIG. 3, cap 14 is lowered onto open end 12, openings 42 and 44 are aligned with each other and free end 30 is inserted through openings 42 and 44 and seats therewithin. Cap 14 is thus secured to the open end 12 of tubular body 4 whereby the chumming material 18 is prevented from prematurely escaping from chum container 16. Further, the location of free end 30 of bait rod 24 within the channel defined by openings 42 and 44 prevents the whole bait 26 from being easily removed by axially sliding the bait off bait rod 24. Thus, bait rod 24 serves an important function in conjunction with openings 42 and 44 provided, respectively, in cap 14 and side wall 8 to provide a simple, inexpensive means for securing the cap in place on the tubular body while increasing the difficulty of removing the impaled whole bait from the bait rod.

In accordance with one embodiment of the present invention wherein lure 2 includes at least two bait rods 24, the bait rods may be connected to each other and this point of connection may preferably occur between proximal arms 34. Referring now to FIGS. 3 and 4, proximal arms 34 are seen to be connected by a substantially linear medial portion 46, and the integrated structure thus formed possesses an essentially U-shaped configuration. In the instance where two or more bait rods 24 are provided, an interconnection such as medial portion 46 may take the form of a disc or the like which may then be fixedly attached to closed end 10. In a preferred embodiment, the lure 2 may be constructed with two bait rods 24, and a corresponding number of openings 42 and 44, in this case, totaling four. In this embodiment, bait rods 24, medial portion 46, and openings 42 and 44 may all lie in the same plane.

In the instance where lure 2 is prepared from a metal, fixing bait rods 24 as illustrated within tube 4 may be accomplished by such techniques as soldering, brazing and the like. The appropriate technique will of course depend upon the composition of the metals comprising the lure and the bond strength desired in the joint. After the rod is fixed in position, it may be bent to form the respective bait rods 24 as shown herein.

The lure of the present invention may include a sinker or weight which will assist in retaining the lure sufficiently sumberged during trolling so as to make the lure readily available to the fish to be caught. Thus, the sinker may be placed within chum container 16 in loose fashion and so as to reside adjacent closed end 10. In a preferred embodiment, particularly with reference to the accompanying drawings, sinker 50 is provided in abutment with closed end 10 and forms the closure thereof. Sinker 50 is attached to side wall 8 and surrounds medial portion 46 giving support to it and to bait rods 24. Thus, in the illustrated embodiment, sinker 50 provides the support and securement for bait rods 24, while closing off one end of tubular body 4. As shown, sinker 50 may be comprised of a conventional lead composition, or may comprise any metal compatible with the metal chosen for the construction of the remaining components of lure 2. Further, though the specific weight of sinker 50 may vary, it has been found in accordance with the present invention that a preferred bait comprises approximately two and one-half ounces. Naturally, if the weight of sinker 50 is insufficient, additional weights may be added in loose fashion to chum container 14 before the chumming material is inserted therein.

Referring further to the Figures, tubular body 4 defines an additional feature which comprises one of the distinctive aspects of the present invention. Specifically, body 4 is provided with at least one, and preferably two over-sized perforations comprising inlet ports 52 located adjacent closed end 10. Inlet ports 52 are larger in size than the remainder of the perforations or escape holes 6 to assist the ambient water in entering chumming container 16 to carry the chumming material out through holes 6. Rather than relying upon a degree of inflow through some of the holes 6 and a corresponding degree of outflow or egress, it has been found that the provision of the larger sized inlet ports 52 serves to establish a more efficient flow pattern which yields a more omnidirectional escape of chumming material with consequent improvement in dispersion of the chum.

In a yet further embodiment illustrated in FIG. 3, lure 2 may be widened in diameter adjacent closed end 10 to define an increased base portion 54. If desired, base portion 54 may be provided to lend greater stability to the construction illustrated in the Figures by offering a greater surface area for connection of medial portion 46 to sinker 50 and body 4.

As noted earlier, the chumming lure of the present invention may be prepared from a wide variety of materials, so long as the materials possess sufficient corrosion resistance to the marine environment, and are sufficiently strong to withstand the stress of use. Thus, and as illustrated herein, the lure of the present invention may be prepared from a variety of metals, including copper based alloys and stainless steels. Further, the lure may be constructed from appropriate organic resinous materials, including natural resins such as cellulose esters and ethers, and synthetic resins such as A-B-S resins, polycarbonates, polyolefins and polyacrylates. In the instance where the lure is manufactured from an organic resinous material, the entire assembly comprising tubular body 4, bait rods 24 and sinker 50 may be prepared as a unitary structure by such techniques as injection molding, stamping and the like. In such procedures, sinker 50 could be located in the mold cavity so that the remaining structure would be molded thereabout. In a preferred embodiment of the present invention, however, lure 2 is prepared from brass.

It is apparent from the foregoing description that the lure of the present invention is of relatively simple construction and, in fact, comprises in final assembly only two detachable components, namely the body 4 and cap 14. The simplicity of the device in construction and operation confers economy in both manufacture and use of the present chumming lure.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. A chumming lure for fish, shellfish and the like which comprises:
   a central, elongated tubular body to hold a quantity of chumming material, said body comprising a cylindrical side wall, a first closed end and a second open end, said side wall defining a plurality of perforations for the release of said chumming material;
   at least one non-linear bait rod attached to said closed end and extending radially therefrom to define a distal free end, said at least one bait rod adapted to impale and retain whole bait thereon;
   a removable cap provided to sealingly engage said open end, said cap including an upstanding eye projecting away from said body, said eye providing attachment means for said lure to a control line or the like; and means for securing said cap and the free end of said at least one bait rod to said body to prevent the premature escape of both said whole bait and said chumming material.

2. The lure of claim 1 wherein said cap includes a continuous rim adapted for annular engagement with a portion of said side wall located adjacent said open end, and said securing means comprises at least two mating openings respectively provided in said side wall and said rim, said mating openings adapted for axial alignment with each other and the free end of said at least one bait rod, said free end adapted to pass through said mating openings and seat therewithin.

3. The lure of claim 1 wherein said at least one bait rod comprises a proximal arm adjacent said body and extending essentially radially therefrom, a distal arm, and a curved elbow portion connecting said proximal arm and said distal arm, whereby said proximal arm and said distal arm subtend an acute angle in the direction of said body.

4. The lure of claim 3 wherein said at least one bait rod comprises at least two bait rods.

5. The lure of claim 3 wherein said at least one bait rod comprises at least two bait rods, and said bait rods are connected to each other at the proximal arms thereof and define between said proximal arms a central medial portion, said medial portion fixedly attached to said closed end.

6. The lure of claim 2 wherein said at least one bait rod comprises two bait rods and said at least two mating openings comprises four mating openings, said openings respectively provided in said side wall and said rim, and wherein the longitudinal axes of said mating openings and the longitudinal axes of said bait rods are all contained within the same plane.

7. The lure of claim 1 further including a sinker provided within said body adjacent said closed end.

8. The lure of claim 7 wherein said sinker is fixedly attached to said side wall and is in contact with said at least one bait rod.

9. The lure of claim 1 wherein at least one of said perforations located adjacent said closed end is of a size larger than that of the remainder of said perforations.

10. The lure of claim 1 wherein said lure is constructed from a resilient, corrosion resistant material selected from the group consisting of copper-base alloys, stainless steel, natural resins and synthetic resins.

* * * * *